US010989356B2

(12) United States Patent
Smedresman et al.

(10) Patent No.: US 10,989,356 B2
(45) Date of Patent: Apr. 27, 2021

(54) SELF-RETAINING OIL NOZZLE (71) Applicant: UNITED TECHNOLOGIES CORPORATION, Farmington, CT (US)

(72) Inventors: Adam G. Smedresman, Larchmont, NY (US); Yuk-Kwan Brian Yuen, Wethersfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 96 days.

(21) Appl. No.: 16/284,554

(22) Filed: Feb. 25, 2019

(65) Prior Publication Data

US 2019/0186689 A1 Jun. 20, 2019

Related U.S. Application Data (63) Continuation-in-part of application No. 15/908,185, filed on Feb. 28, 2018, now Pat. No. 10,215,335, (Continued)

(51) Int. Cl.
F16N 21/04 (2006.01)
B05B 1/00 (2006.01)
B05B 15/14 (2018.01)
F01M 1/08 (2006.01)
F01D 25/16 (2006.01)
(Continued)

(52) U.S. Cl.
CPC ............... F16N 21/04 (2013.01); B05B 1/00 (2013.01); B05B 15/14 (2018.02); B05B 15/65 (2018.02); F01D 25/16 (2013.01); F01D 25/18 (2013.01); F01M 1/08 (2013.01); F05D 2220/32 (2013.01); F05D 2260/98 (2013.01); F16N 2021/005 (2013.01); F16N 2210/02 (2013.01)

(58) Field of Classification Search
CPC ............... F16N 21/04; F16N 2021/005; F16N 2210/02; B05B 15/65; B05B 15/14; B05B 1/00; F01D 25/16; F01D 25/18; F01M 1/08; F05D 2220/32; F05D 2260/98
See application file for complete search history.

(56) References Cited

U.S. PATENT DOCUMENTS 1,748,817 A 2/1930 Zerk
1,799,433 A 4/1931 Murphy
(Continued)

FOREIGN PATENT DOCUMENTS

CN 102143866 8/2011
CN 102466119 5/2012
CN 207942356 10/2018

OTHER PUBLICATIONS

USPTO; Non-Final Office Action dated Aug. 10, 2017 in U.S. Appl. No. 15/252,934.
(Continued)

Primary Examiner — Christopher S Kim
(74) Attorney, Agent, or Firm — Snell & Wilmer L.L.P.

(57) ABSTRACT

An oil nozzle assembly is disclosed. In various embodiments, the assembly includes a nozzle body oriented along an axial center line, comprising a main portion, and a tip portion connected to the main portion; a nozzle insert, comprising a sleeve, an end wall connected to the sleeve, an orifice disposed in the end wall, the orifice fluidly coupled to the tip portion, and a first finger extending axially from the end wall; and a retaining ring configured to engage the first finger to the nozzle body.

10 Claims, 8 Drawing Sheets

Related U.S. Application Data which is a continuation of application No. 15/252,934, filed on Aug. 31, 2016, now Pat. No. 9,939,107.

(51) Int. Cl.
  *F01D 25/18* (2006.01)
  *B05B 15/65* (2018.01)
  *F16N 21/00* (2006.01)

(56) References Cited

U.S. PATENT DOCUMENTS

| | | | |
|---|---|---|---|
| 3,843,030 | A | 10/1974 | Micallef |
| 4,669,664 | A | 6/1987 | Garneau |
| 4,779,803 | A | 10/1988 | Corsette |
| 4,809,816 | A | 3/1989 | Kinack et al. |
| 4,863,354 | A | 9/1989 | Asselin et al. |
| 6,554,212 | B2 | 4/2003 | Borcea et al. |
| 7,314,188 | B2 | 1/2008 | Watson et al. |
| 7,540,434 | B2 | 6/2009 | Gohring |
| 9,939,107 | B2 | 4/2018 | Smedresman |
| 10,215,335 | B2 | 2/2019 | Smedresman |
| 2017/0350275 | A1 | 12/2017 | Von Berg et al. |
| 2018/0058630 | A1 | 3/2018 | Smedresman |
| 2018/0187831 | A1 | 7/2018 | Smedresman et al. |

OTHER PUBLICATIONS

USPTO; Final Office Action dated Nov. 9, 2017 in U.S. Appl. No. 15/252,934.

USPTO; Notice of Allowance dated Jan. 2, 2018 in U.S. Appl. No. 15/252,934.

USPTO; Notice of Allowance dated Feb. 15, 2018 in U.S. Appl. No. 15/252,934.

Extended European Search Report for EP Application No. 17188412.5, dated Jan. 19, 2018, 7 Pages.

USPTO; Notice of Allowance dated Nov. 28, 2018 in U.S. Appl. No. 15/908,185.

USPTO; Non-Final Office Action dated May 18, 2018 in U.S. Appl. No. 15/908,185.

USPTO; Final Office Action dated Sep. 12, 2018 in U.S. Appl. No. 15/908,185.

FIG.2E

SELF-RETAINING OIL NOZZLE

CROSS-REFERENCE TO RELATED APPLICATIONS

This continuation-in-part application claims priority to and the benefit of U.S. patent application Ser. No. 15/908,185, filed on Feb. 28, 2018, which is a continuation of U.S. patent application Ser. No. 15/252,934, filed on Aug. 31, 2016, now U.S. Pat. No. 9,939,107, the entirety of which are incorporated herein for all purposes by this reference.

FIELD

The present disclosure relates generally to gas turbine engines and, more particularly, to oil nozzles for use in gas turbine engines.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, where energy is extracted from the hot combustion gases to power the compressor section, the fan section and various other loads occurring within or proximate a gas turbine engine.

Within gas turbine engines, oil nozzles are used for distributing lubricating oil throughout bearing compartments. Oil nozzles incorporated into the bearing compartments, and other gas turbine engine housings, require flow testing before use. Disassembling compartments to perform flow testing can expose large and expensive parts to damage and debris within the compartments. If parts become damaged, entire housings and assemblies may require replacement.

Oil nozzles often include fasteners as large as or larger than the nozzles themselves for retaining the nozzles within the bearing compartment. Oil nozzles with large fasteners often cannot be removed from the bearing compartments without disassembling major engine modules due to other engine components being in the path of extraction or space requirements for tooling to engage the nozzle fasteners.

SUMMARY

An oil nozzle assembly is disclosed. In various embodiments, the assembly includes a nozzle body oriented along an axial center line, comprising a main portion, and a tip portion connected to the main portion; a nozzle insert, comprising a sleeve, an end wall connected to the sleeve, an orifice disposed in the end wall, the orifice fluidly coupled to the tip portion, and a first finger extending axially from the end wall, and a retaining ring configured to engage the first finger to the nozzle body.

In various embodiments, the first finger includes a sleeve ring groove configured to engage the retaining ring. In various embodiments, the nozzle body includes a body ring groove configured for seating the retaining ring therein. In various embodiments, the retaining ring and the nozzle body comprise a monolithic component.

In various embodiments, the first finger defines a finger outer radius and includes a first distal end having a first distal end outer radius greater than the finger outer radius. In various embodiments, the first distal end includes a sleeve ring groove configured to engage the retaining ring. In various embodiments, a second finger is spaced radially from the first finger, is defined by the finger outer radius and includes a second distal end having a second distal end outer radius greater than the finger outer radius.

In various embodiments, an anti-rotation feature extends from a radially outer surface of the nozzle body and is configured for contact with one of the first finger and the second finger upon rotation of the nozzle insert with respect to the nozzle body. In various embodiments, the first distal end and the second distal end include a chamfered portion configured to slide the first distal end and the second distal end radially outward over the retaining ring during assembly. In various embodiments, an O-ring is configured for disposition between a radially outer surface of the tip portion and a radially inner surface of the nozzle insert. In various embodiments, the radially outer surface of the tip portion includes a first cutout portion configured for seating the O-ring.

An oil nozzle assembly is disclosed. In various embodiments, the assembly includes a nozzle body, comprising a main portion, a tip portion connected to the main portion, and a lip extending radially outward from the tip portion; a nozzle insert, comprising a sleeve, an end wall connected to the sleeve, an orifice disposed in the end wall, the orifice fluidly connected to the tip portion, and a retention element extending radially inward from the sleeve and configured to engage the lip during assembly of the nozzle insert to the nozzle body; and a bias element disposed between the nozzle insert and the nozzle body.

In various embodiments, the bias element comprises at least one of a wave spring and a coil spring. In various embodiments, the bias element comprises a wave spring having a plurality of troughs and a plurality of peaks. In various embodiments, the nozzle body includes a collar configured to abut the plurality of troughs. In various embodiments, the nozzle insert includes a base portion configured to abut the plurality of peaks.

In various embodiments, the retention element comprises a first segment connected to a radially inner surface of the sleeve, a second segment connected to the first segment and a third segment connected to the second segment. In various embodiments, an O-ring is configured for disposition between a radially outer surface of the tip portion and a radially inner surface of the nozzle insert. In various embodiments, the tip portion of the nozzle body includes at least a channel portion formed by the lip for receiving the retention element of the nozzle insert.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figures 1A, 1B:
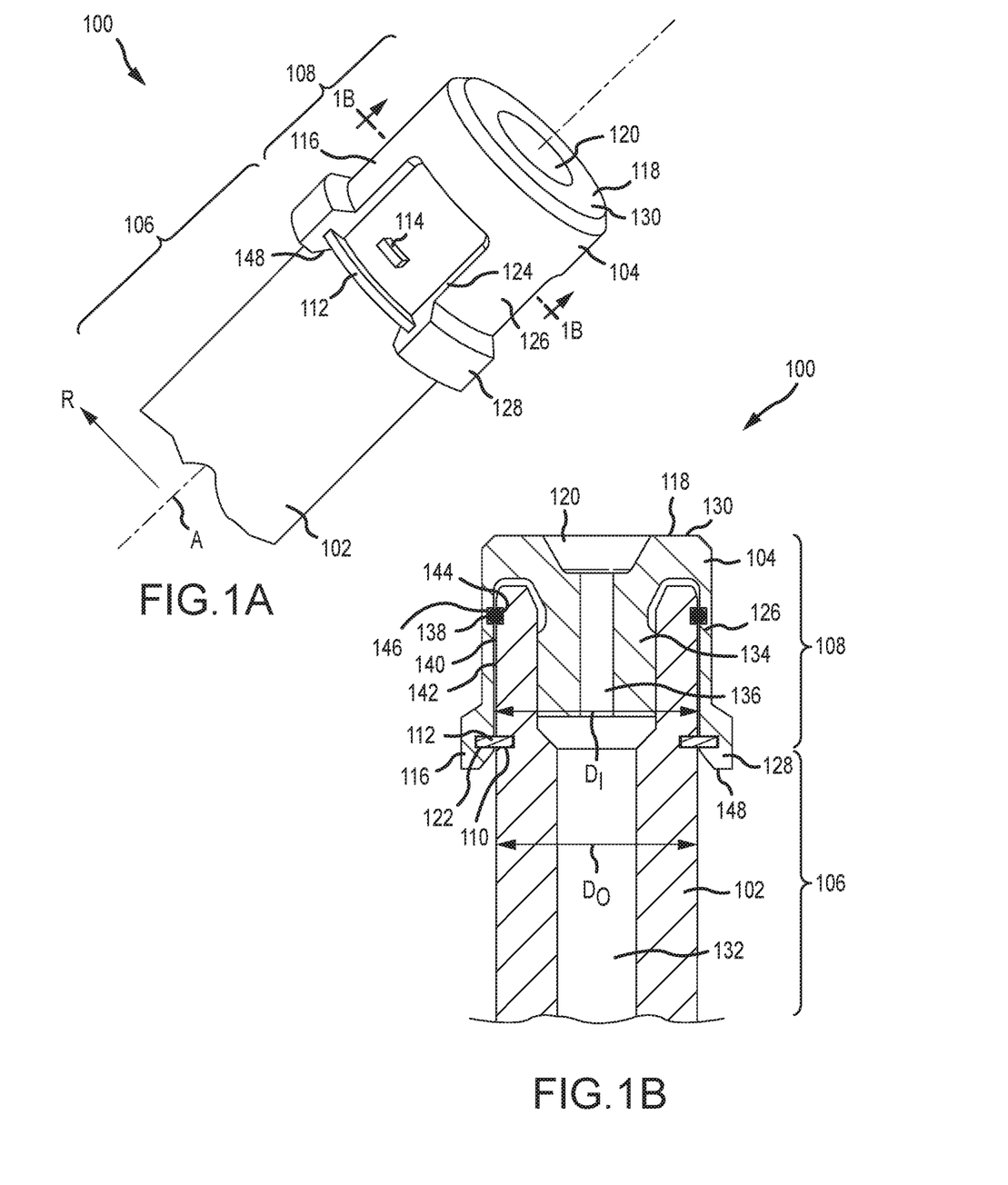
FIG. 1A is an isometric view of an oil nozzle assembly with a nozzle insert and a nozzle body, in accordance with various embodiments.
FIG. 1B is a cross-sectional view of the nozzle insert and nozzle body taken along line 1-1 from FIG. 1A, in accordance with various embodiments.
Figures 1C, 1D:
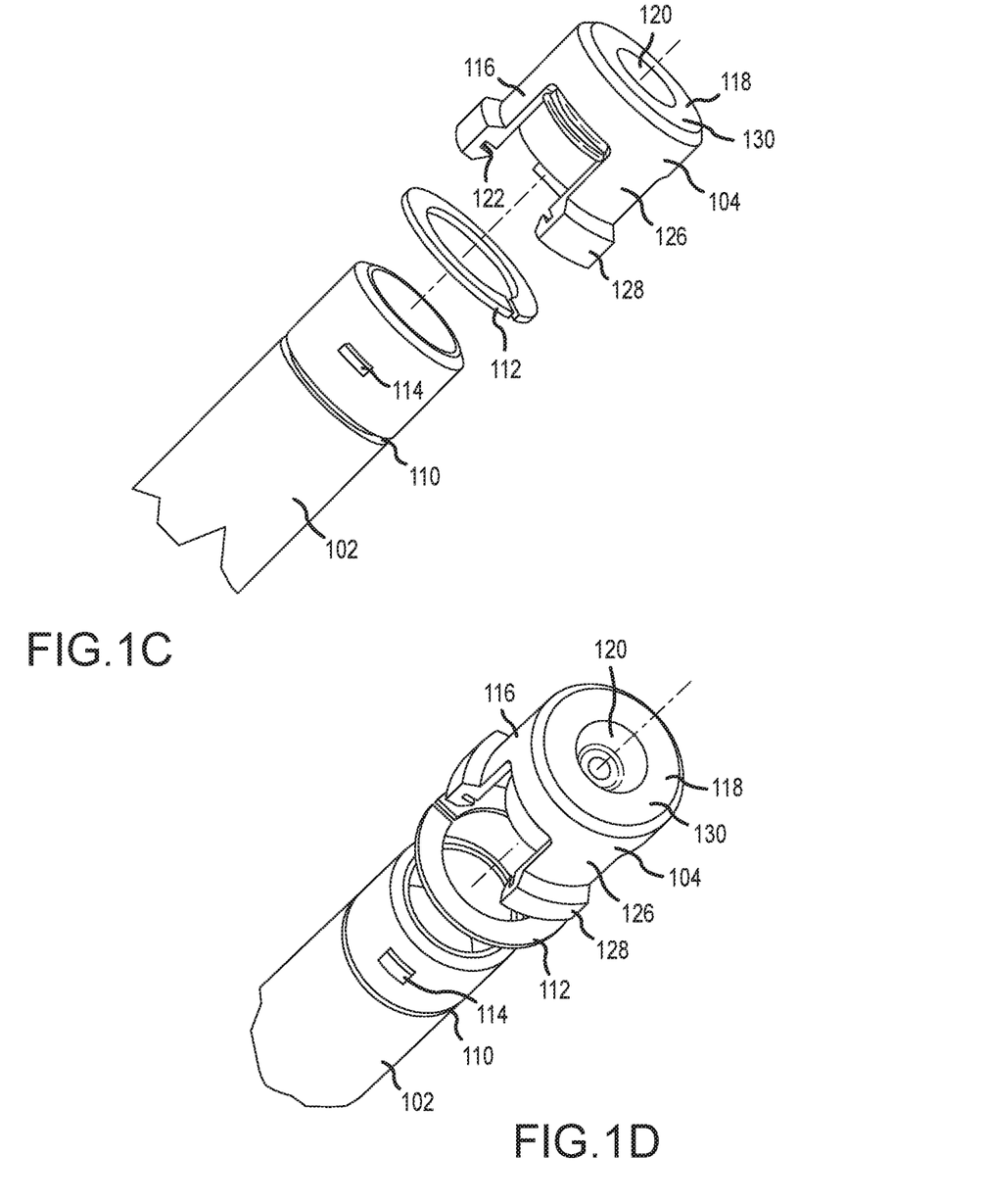
FIG. 1C is an exploded isometric view of the nozzle body and the nozzle insert of FIG. 1A, with the nozzle insert shown in a cross-section view, in accordance with various embodiments.
FIG. 1D is another exploded isometric view of the nozzle body and the nozzle insert of FIG. 1A, in accordance with various embodiments.
Figure 1E:
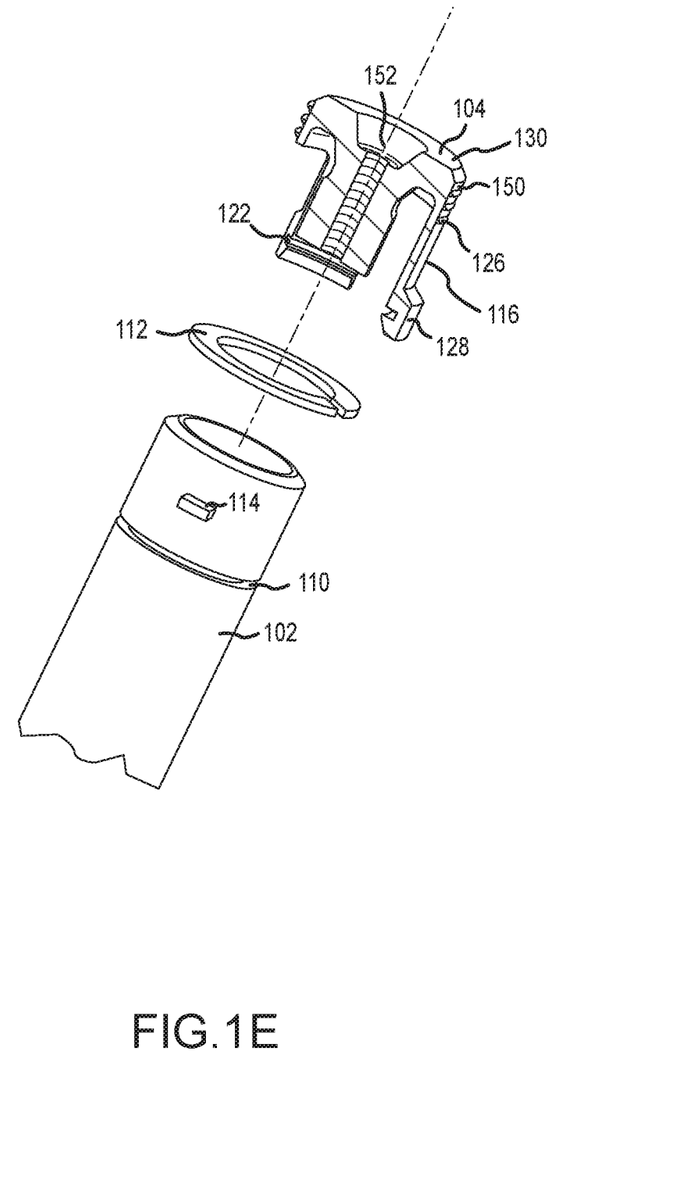
FIG. 1E is an exploded isometric view of the nozzle body and the nozzle insert of FIG. 1A, with the nozzle insert shown in a cross-section view, in accordance with various embodiments.

Referring now to the drawings, FIGS. 1A-1E illustrate different aspects of an oil nozzle assembly 100 having a nozzle body 102 and a nozzle insert 104 configured for removable engagement with the nozzle body 102. FIGS. 1A and 1B illustrate the nozzle insert 104 disposed onto the nozzle body 102 and FIGS. 1C, 1D and 1E illustrate exploded views of the nozzle body 102 and the nozzle insert 104. FIG. 1B is a cross-sectional view of the nozzle body 102 and the nozzle insert 104 taken along the line 1B-1B from FIG. 1A. In various embodiments, the oil nozzle assembly 100 defines an axial center line A and a radial direction R extending perpendicular to the axial center line A.

Referring now to FIGS. 1A and 1B, isometric and cross sectional views of the oil nozzle assembly 100, having the nozzle body 102 and the nozzle insert 104, are provided. The nozzle body 102 includes a main portion 106, a tip portion 108 and a body ring groove 110 configured to seat therein a retaining ring 112. The tip portion 108 of the nozzle body 102 is connected to the main portion 106 and is located at a distal end of the nozzle body 102. In various embodiments, the main portion 106 and the tip portion 108 may comprise a monolithic component, made of one continuous piece of material, or, in various embodiments, the main portion 106 and the tip portion 108 may comprise separate components attached to one another. For example, in various embodiments, the main portion 106 and the tip portion 108 may be separate elements connected together through chemical or mechanical attachment. The nozzle body 102 may include a metallic material such as nickel, titanium, steel or aluminum, as well as non-metallic materials. Additionally, the nozzle body 102, while illustrated as cylindrical in shape with a circular cross-section, may exhibit other geometric shapes, such as, for example, shapes having rectangular or oval cross-sections.

In various embodiments, both the main portion 106 and the tip portion 108 of the nozzle body 102 exhibit an outer diameter $D_O$. The body ring groove 110 may extend circumferentially about the outer diameter $D_O$ of the nozzle body 102 proximate an intersection or interface of the main portion 106 and the tip portion 108. The retaining ring 112 is configured to seat within the body ring groove 110. For example, in various embodiments, the retaining ring 112 may comprise an annular piece of material having a slit or cut extending therethrough that defines a first end and a second end of the retaining ring (e.g., as illustrated in FIGS. 1C, 1D and 1E). The retaining ring 112 may be incorporated the body ring groove 110 by separating the first end and the second end from one another and manipulating the retaining ring 112 about the nozzle body 102 until the retaining ring 112 fits into the body ring groove 110. In various embodiments, the retaining ring 112 may comprise a circlip or a Spirolox® Retaining Ring, available, for example, from Smalley USA, Lake Zurich, Ill. (www.smalley.com). In various embodiments, however, the retaining ring 112 may be made integral with the nozzle body 102, such that the retaining ring 112 and the nozzle body 102 comprise a monolithic component, made of one continuous piece of material. An anti-rotation feature 114 may be disposed on and extend from the surface of the tip portion 108 of the nozzle body 102. In various embodiments, the anti-rotation feature 114 includes a tab of solid material extending radially outward from the nozzle body 102. The anti-rotation feature 114 may extend radially outward from the nozzle body 102 so as to engage with the nozzle insert 104 and prevent the nozzle insert 104 from rotating about the nozzle body 102. In various embodiments, the anti-rotation feature 114 may also be located on the main portion 106 of the nozzle body 102.

The nozzle insert 104 may include a sleeve 116, an end wall 118, an orifice 120 and a sleeve ring groove 122. The nozzle insert 104 may comprise a metallic material, such as, for example, nickel, titanium, steel or aluminum or, in various embodiments, a non-metallic material, such as, for example, a composite material. In various embodiments, the nozzle insert 104 may be formed through layer-by-layer additive manufacturing. The nozzle insert 104 may also be formed through subtractive manufacturing, or by attaching separate pieces of material together to form the nozzle insert 104. The sleeve 116 includes a tubular piece of solid material extending in a circumferential direction around the nozzle insert 104. In various embodiments, the sleeve 116 includes an interrupted surface that includes a plurality of cutouts 124 or openings in the sleeve 116 that provide a plurality of fingers 126 (e.g., a first finger and a second finger) that extend axially along the sleeve 116. The plurality of fingers 126 add flexibility to the sleeve 116 enabling one or more distal ends 128 of the sleeve 116 (i.e., the ends of the sleeve 116 proximate the sleeve ring groove 122 at each of the plurality of fingers 126) to flex outwardly and engage with the retaining ring 112 during assembly. In various embodiments, the end wall 118 includes a flat circular disk of solid material. The end wall 118 is connected to the sleeve 116 and is positioned at a proximal end 130 of the sleeve 116. The orifice 120 includes a hole or bore disposed in the end wall 118. While illustrated having a circular shape, the orifice 120 may include non-circular shapes, as well as an orientation that is not normal to the end wall 118.

Each of the one or more distal ends 128 (e.g., a first distal end and a second distal end) of the sleeve 116 comprise a block of material that is connected to or integral with a corresponding one of the plurality of fingers 126 and into which the sleeve ring groove 122 is cut or disposed. In various embodiments, the block of material defines an outer radius (e.g., a first distal end outer radius or a second distal end outer radius) greater in value than a corresponding outer radius of a corresponding one of the plurality of fingers (e.g., a finger outer radius) from which the block of material extends, the block of material providing additional structural integrity to house the sleeve ring groove 122. In various embodiments, the sleeve 116, the end wall 118 and the plurality of fingers 126 are connected to one another and may be formed as a monolithic component from a single piece of material, such as, for example, through additive or subtractive methods of manufacturing. In various embodiments, the sleeve 116, the end wall 118 and the plurality of fingers 126 may comprise separate elements connected together through, for example, chemical or mechanical attachment. In various embodiments, the plurality of fingers 126 define an inner diameter $D_I$ that is substantially equal to the outer diameter $D_O$ of the tip portion 108 of the nozzle body 102. As illustrated in various of the drawings, each of the plurality of fingers 126 extends circumferentially about a portion of the nozzle insert 104 and is configured to mate with corresponding circumferential portions of the tip portion 108 of the nozzle body 102. As further illustrated in the drawings, each of the one or more distal ends 128 of the sleeve 116 is configured to engage the retaining ring 112 that is also configured to engage the nozzle body 102. Engagement of the one or more distal ends 128 with the retaining ring 112 prevents axial displacement of the nozzle insert 104 with respect to the tip portion 108 of the nozzle body 102. In various embodiments, such axial displacement may result from pressure applied against the nozzle insert 104 by the fluid being transported from the nozzle body 102 to the nozzle insert 104.

As illustrated in FIG. 1B, the nozzle body 102 includes a first bore 132 and the nozzle insert 104 includes a plug 134 and a second bore 136. An O-ring 138 is configured for disposition between a radially outer surface 140 of the tip portion 108 of the nozzle body 102 and a radially inner surface 142 of the nozzle insert 104. In various embodiments, a first cutout portion 144 may be cut or disposed within the radially outer surface 140 of the tip portion 108 to accommodate the O-ring 138. Similarly, a second cutout portion 146 may be cut or disposed within the radially inner surface 142 of the nozzle insert 104 to accommodate the O-ring 138. The first bore 132 includes a channel extending through the nozzle body 102 providing for the passage of a fluid through the nozzle body 102. The plug 134 includes a solid piece of material that extends axially inward through a center portion of the nozzle insert 104. The second bore 136 includes a channel running through the plug 134 of the nozzle insert 104, providing for the passage of the fluid through the nozzle insert 104. Together, the first bore 132 and the second bore 136 form a channel extending through the main portion 106 and the tip portion 108 of the nozzle body 102 and through the nozzle insert 104. The second bore 136 opens into the orifice 120 in the end wall 118 and fluidly connects to the channel formed by the first bore 132 and the second bore 136. The O-ring 138 includes a ring of solid material extending circumferentially about the radially inner surface 142 of the nozzle insert 104 and the radially outer surface 140 of the tip portion 108 and, in various embodiments, is seated within the first cutout portion 144 and the second cutout portion 146. The O-ring 138 provides a seal between the radially inner surface 142 of the nozzle insert 104 and the radially outer surface 140 of the tip portion 108 of the nozzle body 102, thereby preventing the passage of the fluid past the O-ring 138. In various embodiments, the oil nozzle assembly 100 may include additional O-rings disposed on an interface between the nozzle body 102 and the nozzle insert 104.

The oil nozzle assembly 100 provides a "snap on and off" design allowing for installation and removal of the nozzle insert 104 without the need for separate fasteners for attaching the nozzle insert 104 to the nozzle body 102. Removing the need for separate fasteners eliminates the requirement for extra time and space to remove the nozzle insert 104 from an oil bearing compartment. During testing phases of the oil nozzle assembly 100, for example, ease of installation and removal is greatly increased allowing for faster changeovers during such testing. Replacement of damaged nozzles is also made easier by enabling just the nozzle insert 104 to be replaced as opposed to removal and replacement of the nozzle body 102 from the bearing compartment, such as is generally required with nozzles comprising removable fasteners or nozzles that include a nozzle insert and nozzle body built as a single piece.

In various embodiments, removal of the nozzle insert 104 from the nozzle body 102 may be accomplished using a small tool that interacts with the one or more distal ends 128 of the sleeve 116 (i.e., the ends of the sleeve 116 proximate the sleeve ring groove 122 at each of the plurality of fingers 126) in order to urge the one or more distal ends 128 of the sleeve 116 radially outward from the nozzle body 102 and the retaining ring 112. Once the one or more distal ends 128 of the sleeve 116 are urged away from the retaining ring 112, the nozzle insert 104 is no longer engaged with the nozzle body 102 and may be removed therefrom. In various embodiments, an end of the retaining ring 112 may be unwound from the nozzle body 102 by pulling on the end and threading the retaining ring 112 through one of the plurality of cutouts 124 or openings in the sleeve 116, thereby disengaging the nozzle insert 104 from the nozzle body 102. During assembly, the nozzle insert 104 may be urged axially onto the nozzle body 102, such that a chamfered portion 148 on each of the one or more distal ends 128 of the sleeve 116 may slide the one or more distal ends 128 radially outward and over the retaining ring 112, followed by locking of the body ring groove 110 with the retaining ring 112. Referring to FIG. 1E, in various embodiments, the nozzle insert 104 may include a first threaded surface 150 cut into a radially outer surface of the sleeve 116 proximate the proximal end 130 of the sleeve 116 or a second threaded surface 152 cut into a radially inner surface of the second bore 136. Either or both of the first threaded surface 150 and the second threaded surface 152 may be engaged with an article designed to assist removal or installation of the nozzle insert 104 by placing an axial load on the nozzle insert 104 with respect to the nozzle body 102.

As illustrated in FIGS. 1A-1B, the nozzle insert 104 is disposed onto and covers the tip portion 108 of the nozzle body 102. During operation of the oil nozzle assembly 100, oil is pumped through the first bore 132 of the nozzle body 102, from an oil bearing housing or reservoir that the nozzle body 102 is connected to, through the second bore 136 of the nozzle insert 104, and directed out of the orifice 120 of the nozzle insert 104. The oil directed out of nozzle insert 104 enters into an oil bearing compartment to lubricate a bearing or set of bearings, such as, for example, bearings housed within a gas turbine engine or other machines that include bearing compartments.

Figure 2A:
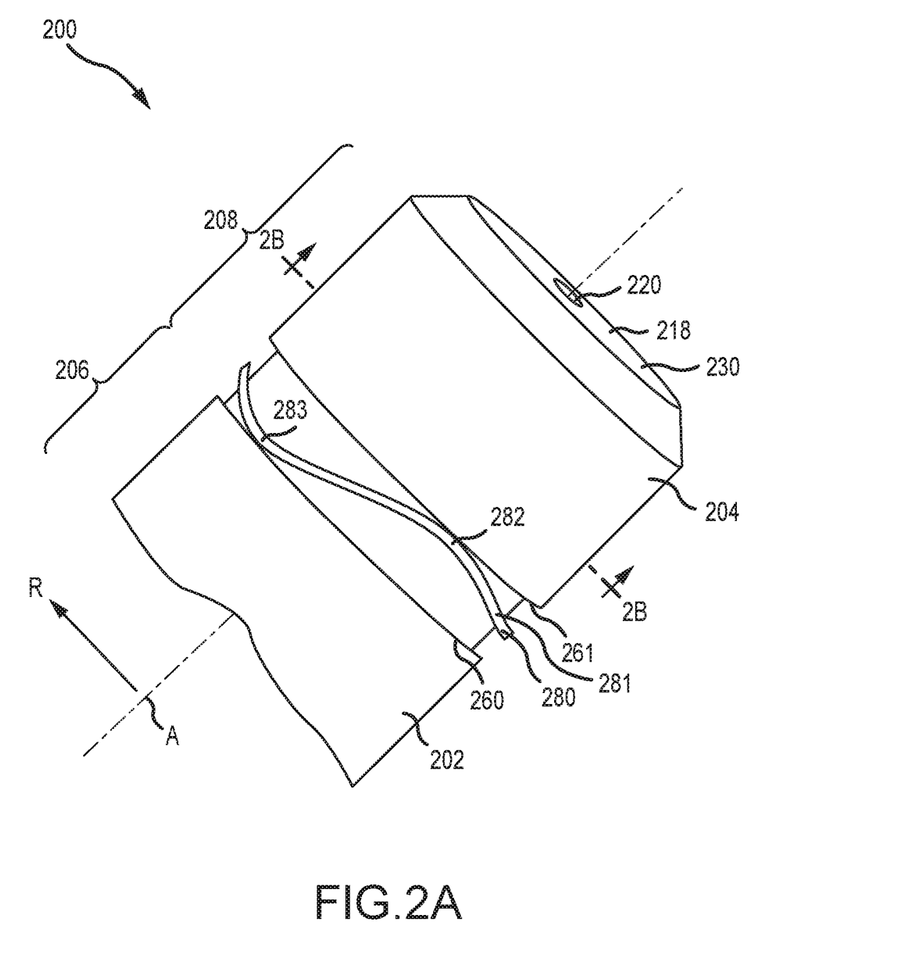
FIG. 2A is an isometric view of another oil nozzle assembly with a nozzle insert and a nozzle body, in accordance with various embodiments.
Figure 2B:
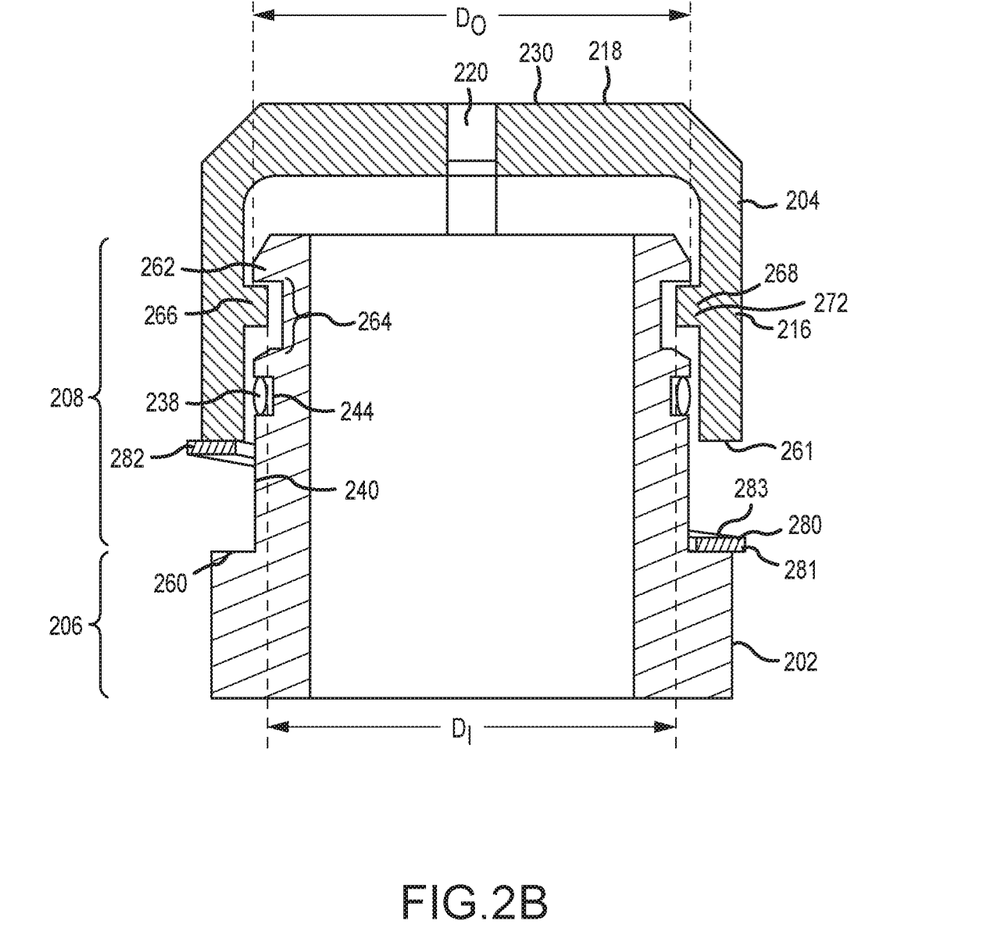
FIG. 2B is a cross-sectional side view of the nozzle insert and nozzle body taken along line 2-2 from FIG. 2A, in accordance with various embodiments.
Figure 2C:
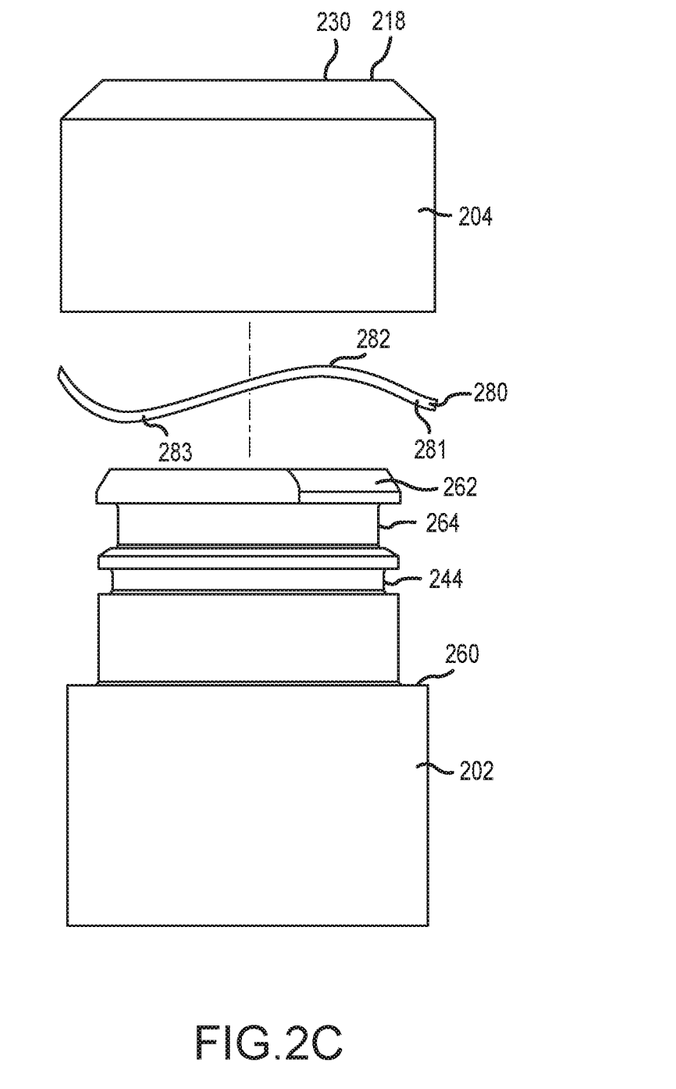
FIG. 2C is an exploded side view of the nozzle body and the nozzle insert of FIG. 2A, in accordance with various embodiments.
Figure 2D:
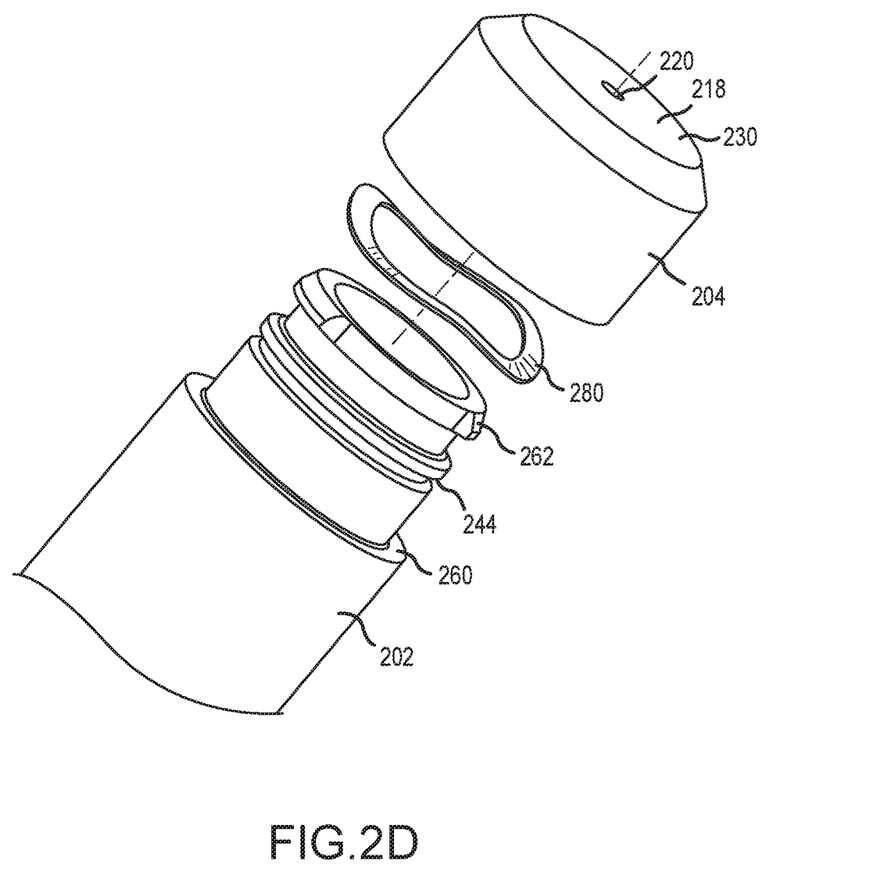
FIG. 2D is an exploded isometric view of the nozzle body and the nozzle insert of FIG. 2A, in accordance with various embodiments.
Figure 2E:
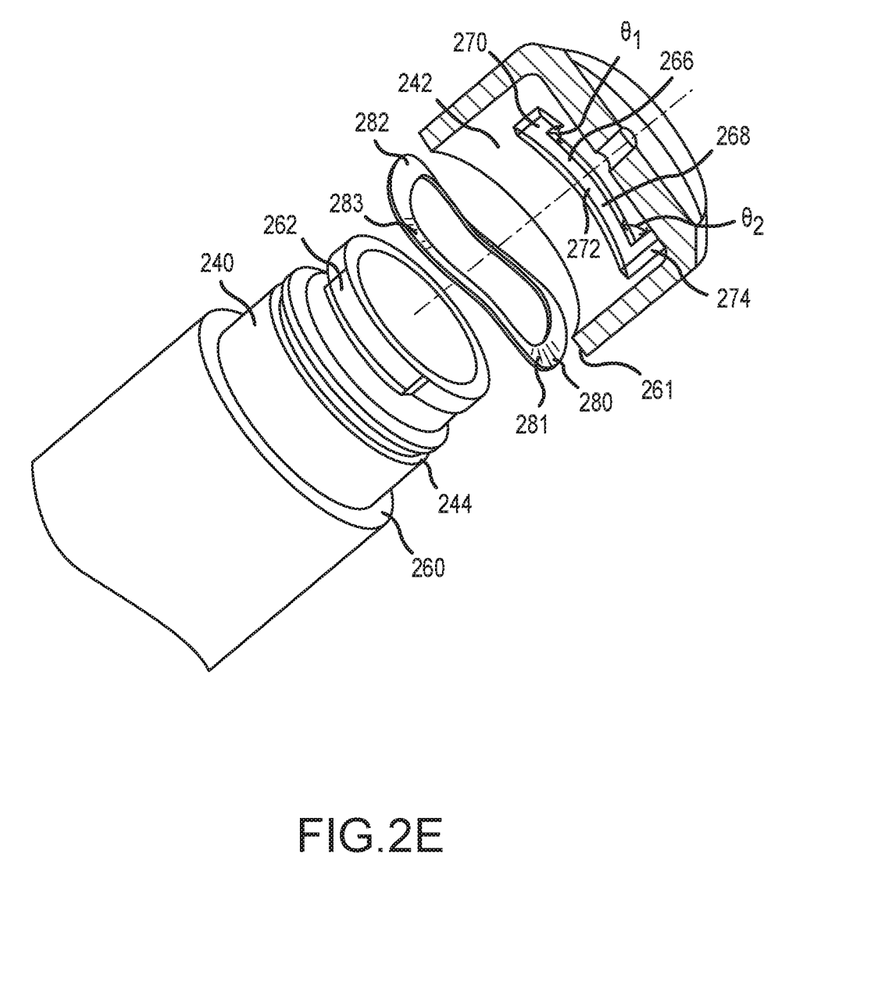
FIG. 2E is another exploded isometric view of the nozzle body and the nozzle insert of FIG. 2A, with the nozzle insert shown in a cross-section view, in accordance with various embodiments.

Referring now to FIGS. 2A-2E, different aspects of an oil nozzle assembly 200, having a nozzle body 202 and a nozzle insert 204 configured for removable engagement with the nozzle body 202, are provided. FIGS. 2A-2B illustrate the nozzle insert 204 disposed onto the nozzle body 202 and FIGS. 2C-2E illustrate exploded views of the nozzle body 202 and the nozzle insert 204. FIG. 2B provides a cross-sectional view of the nozzle body 202 and the nozzle insert 204 taken along the line 2B-2B from FIG. 2A. In various embodiments, the oil nozzle assembly 200 defines an axial center line A and a radial direction R extending perpendicular to the axial center line A.

Referring now to FIGS. 2A and 2B, isometric and cross sectional views of the oil nozzle assembly 200, having the nozzle body 202 and the nozzle insert 204, are provided. The nozzle body 202 includes a main portion 206, a tip portion 208, a collar 260 and a lip 262. The tip portion 208 of the nozzle body 202 is connected to the main portion 206 and is located on a distal end of the nozzle body 202. In various embodiments, the main portion 206 and the tip portion 208 may comprise a monolithic component, made of one continuous piece of material, or, in various embodiments, the main portion 206 and the tip portion 208 may be separate elements connected together through chemical or mechanical attachment. The collar 260 is positioned at an interface between the main portion 206 and the tip portion 208. The tip portion 208 includes the lip 262 which, in various embodiments, includes a solid piece of material that extends radially outward from the tip portion 208. The lip 262 is disposed on a distal end of the tip portion 208 from the main portion 206 of the nozzle body 202. The lip 262 also forms a channel 264 (or, in various embodiments, a channel portion that extends partly about the nozzle body 202) in the tip portion 208 of the nozzle body 202. The lip 262 defines an outer diameter $D_O$. The oil nozzle assembly 200 also includes an O-ring 238 configured for positioning between the tip portion 208 of the nozzle body 202 and the nozzle insert 204. In various embodiments, a first cutout portion 244 may be cut or disposed within a radially outer surface 240 of the tip portion 208 to accommodate the O-ring 238.

The nozzle insert 204 may include a sleeve 216, an end wall 218, an orifice 220 and a retention element 266. In various embodiments, the sleeve 216 includes a tubular piece of solid material extending in a circumferential direction around the nozzle insert 204. The end wall 218 includes a flat circular disk of solid material. The end wall 218 is connected to the sleeve 216 and is positioned at a proximal end 230 of the sleeve 216. The orifice 220 includes a hole or bore disposed in the end wall 218. The retention element 266 includes a tab of solid material that is connected to the sleeve 216 and extends radially inward from the sleeve 216. The retention element 266 defines an inner diameter $D_I$. As shown in FIG. 2E, the retention element 266 may include a tab 268 that includes a first segment 270, a second segment 272 and a third segment 274. In various embodiments, the first segment 270, the second segment 272 and the third segment 274 include solid pieces of material extending radially inward from a radially inner surface 242 of the sleeve 216.

The first segment 270 is connected to the radially inner surface 242 of the sleeve 216. The second segment 272 is connected to the first segment 270 and, in various embodiments, is greater in length than the first segment 270. A first angle $\theta_1$ is formed between the first segment 270 and the second segment 272. In various embodiments, the first angle $\theta_1$ is equal to about ninety degrees (90°). The third segment 274 is connected to the second segment 272 and, in various embodiments, is lesser in length than the second segment 272 and about equal in length to the first segment 270. A second angle $\theta_2$ is formed between the second segment 272 and the third segment 274. In various embodiments, the second angle $\theta_2$ is equal to about ninety degrees (90°). In various embodiments, the first angle $\theta_1$ and the second angle $\theta_2$ may equal greater or lesser than ninety degrees (90°). Circumferentially outward of the first segment 270 and the third segment 274 is a circumferential segment of the radially inner surface 242 having no structure extending radially inward that is sufficiently long to enable the lip 262 to pass axially beyond the tab 268 during assembly. In various embodiments, the second segment 272 extends along the radially inner surface 242 of the sleeve 216 a sweep angle in a circumferential direction equal to about ninety degrees (90°) and the first segment 270 and the third segment 274 extend substantially perpendicular to the second segment 272, in an axial direction toward the end wall 218.

In various embodiments, the oil nozzle assembly 200 further comprises a bias element 280 disposed intermediate the nozzle body 202 and the nozzle insert 204. In various embodiments, the bias element 280 may comprise a wave spring 281 (as illustrated). The wave spring 281 may comprise a plurality of peaks 282 configured to contact a base portion 261 of the nozzle insert 204 and a plurality of troughs 283 configured to contact the collar 260 of the nozzle body 202. In various embodiments, a number of the plurality of peaks 282 and a number of the plurality of troughs 283 is equal to or greater than two. In various embodiments, the bias element 280 may comprise a coil spring or other spring-like member configured to provide an axial force between the collar 260 of the nozzle body 202 and the base portion 261 of the nozzle insert 204, thereby biasing the nozzle insert 204 away from the nozzle body 202.

In various embodiments, the channel 264 of the tip portion 208 disposed on the nozzle body 202 is configured to receive the retention element 266 disposed on the nozzle insert 204. As shown in FIG. 2B, the second segment 272 of the retention element 266 is positioned within the channel 264 when the nozzle insert 204 is assembled with the nozzle body 202. An inner diameter $D_I$ of the retention element 266 is less than the outer diameter $D_O$ of the lip 262, such that the lip 262 prevents the retention element 266 from movement in a direction towards a distal end of the tip portion 208 opposite the main portion 206 of the nozzle body 202.

The oil nozzle assembly 200 allows for installation and removal of the nozzle insert 204, onto and off from the nozzle body 202 via a pressing and twisting process. For example, during installation of the nozzle insert 204 onto the nozzle body 202, the nozzle insert 204 is brought into alignment with the nozzle body 202, such that the nozzle insert 204 or the sleeve 216 may be positioned about the tip portion 208 of the nozzle body 202. As the nozzle insert 204 becomes engaged with the tip portion 208, the bias element 280 comes into contact with and affects an axial load between the collar 260 of the nozzle body 202 and the base portion 261 of the nozzle insert 204. After the bias element 280 comes into contact with the collar 260 and the base portion 261, the nozzle insert 204 is urged further towards the main portion 206 of the nozzle body 202 to compress the bias element 280 (e.g., the wave spring 281), thereby enabling the sleeve 216 to be urged closer toward the collar 260 than if the bias element 280 were not compressed. As the sleeve 216 is urged closer to the collar 260, the retention element 266 of the nozzle insert 204 (or the tab 268) is drawn axially towards the collar 260 and, eventually, beyond the lip 262. Once the retention element 266 of the nozzle insert 204 is urged beyond the lip 262, the nozzle insert 204 may be twisted with respect to the nozzle body 202 until the retention element 266 and the lip 262 are brought into axial alignment. Pressure against the nozzle insert 204 is then relieved allowing the bias element 280 to urge the nozzle insert 204 away from the nozzle body 202 until the lip 262 is seated within the retention element 266 (e.g., until the lip 262 is seated against the second segment 272 and between the first segment 270 and the third segment 274), thereby providing a locked state between the nozzle insert 204 and the nozzle body 202.

In the locked state, the retention element 266 and the lip 262 cannot be moved rotationally relative to each other unless the nozzle insert 204 is urged toward the nozzle body 202. As the nozzle insert 204 is urged toward the nozzle body 202, the bias element 280 (e.g., the wave spring 281) compresses and the first segment 270 and the third segment 274 of the retention element 266 (e.g., the tab 268) are urged beyond the lip 262, thereby allowing the nozzle insert 204 to rotate relative to the nozzle body 202. The nozzle insert 204 may then be rotated relative to the nozzle body 202 such that the retention element 266 becomes disengaged from the lip 262, thereby allowing the nozzle insert 204 to be drawn away from and off of the tip portion 208 of the nozzle body 202.

The "locking" capability of the oil nozzle assembly 200 allows the nozzle insert 204 to remain attached onto the nozzle body 202 during use of the oil nozzle assembly 200 without coming loose or dislodged from the nozzle body 202. Only upon a first translational and a second rotational application of force to the nozzle insert 204 relative to the nozzle body 202 may the nozzle insert 204 be removed from the nozzle body 202. Advantageously, the oil nozzle assembly 200 does not include a removable fastener, which eliminates the need for large clearances surrounding the nozzle insert 204 for adequate space for access to such removable fasteners. Absent the need for extra space to remove such fasteners, the oil nozzle assembly 200 allows for tighter tolerances and spacing between the components within an oil bearing assembly that houses the oil nozzle assembly 200.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An oil nozzle assembly, comprising:
   a nozzle body oriented along an axial center line, comprising
   a main portion, and
   a tip portion connected to the main portion;

a nozzle insert, comprising
an end wall,
an orifice disposed in the end wall, the orifice fluidly coupled to the tip portion,
a first finger extending axially from the end wall, and
a second finger extending axially from the end wall and spaced circumferentially from the first finger; and
a retaining ring configured to engage the first finger to the nozzle body.

2. The oil nozzle assembly of claim 1, wherein the first finger includes a ring groove configured to engage the retaining ring.

3. The oil nozzle assembly of claim 2, wherein the nozzle body includes a body ring groove configured for seating the retaining ring therein.

4. The oil nozzle assembly of claim 1, wherein the first finger defines a finger outer radius and includes a first distal end having a first distal end outer radius greater than the finger outer radius.

5. The oil nozzle assembly of claim 4, wherein the first distal end includes a ring groove configured to engage the retaining ring.

6. The oil nozzle assembly of claim 5, wherein the second finger includes a second distal end having a second distal end outer radius greater than the finger outer radius.

7. The oil nozzle assembly of claim 6, further comprising an anti-rotation feature extending from a radially outer surface of the nozzle body and configured for contact with one of the first finger and the second finger upon rotation of the nozzle insert with respect to the nozzle body.

8. The oil nozzle assembly of claim 6, wherein the first distal end and the second distal end include a chamfered portion configured to slide the first distal end and the second distal end radially outward over the retaining ring during assembly.

9. The oil nozzle assembly of claim 8, further comprising an O-ring configured for disposition between a radially outer surface of the tip portion and a radially inner surface of the nozzle insert.

10. The oil nozzle assembly of claim 9, wherein the radially outer surface of the tip portion includes a first cutout portion configured for seating the O-ring.

* * * * *